(12) United States Patent
Hutchins et al.

(10) Patent No.: US 7,428,116 B2
(45) Date of Patent: Sep. 23, 2008

(54) METHOD FOR A CYCLIC DIBIT RESPONSE ESTIMATION IN A MEDIA SYSTEM USING A DATA SET SEPARATOR SEQUENCE

(75) Inventors: Robert A. Hutchins, Tucson, AZ (US); Evangelos S. Eleftheriou, Zurich (CH); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/122,680

(22) Filed: May 5, 2005

(65) Prior Publication Data

US 2006/0250719 A1    Nov. 9, 2006

(51) Int. Cl.
*G11B 5/035* (2006.01)

(52) U.S. Cl. ............... 360/65; 360/48; 360/46
(58) Field of Classification Search ........ None
See application file for complete search history.

(56) References Cited

U.S. PATENT DOCUMENTS

| | | | |
|---|---|---|---|
| 5,381,359 A * | 1/1995 | Abbott et al. ........ 708/322 |
| 5,424,881 A * | 6/1995 | Behrens et al. ........ 360/40 |
| 5,432,821 A * | 7/1995 | Polydoros et al. ........ 375/340 |
| 5,596,587 A * | 1/1997 | Douglas et al. ........ 714/739 |
| 5,966,258 A * | 10/1999 | Bliss ........ 360/46 |
| 6,208,477 B1 | 3/2001 | Cloke et al. |
| 6,249,398 B1 * | 6/2001 | Fisher et al. ........ 360/65 |
| 6,516,443 B1 * | 2/2003 | Zook ........ 714/792 |
| 6,636,372 B1 | 10/2003 | Nguyen et al. |
| 6,693,755 B2 | 2/2004 | Maple et al. |
| 6,744,581 B2 * | 6/2004 | Miyamura ........ 360/53 |
| 6,765,741 B2 | 7/2004 | Berman et al. |
| 6,771,699 B1 * | 8/2004 | Karaoquz et al. ........ 375/224 |
| 7,019,922 B2 * | 3/2006 | Howarth et al. ........ 360/39 |
| 7,119,974 B2 * | 10/2006 | Jaquette ........ 360/46 |
| 7,139,142 B2 * | 11/2006 | Berman et al. ........ 360/39 |
| 2003/0028833 A1 | 2/2003 | Coker et al. |
| 2003/0123587 A1 * | 7/2003 | Blaum et al. ........ 375/354 |
| 2006/0085497 A1 * | 4/2006 | Sehitoglu ........ 708/405 |

* cited by examiner

*Primary Examiner*—Andrea Wellington
*Assistant Examiner*—Dismery Mercedes
(74) *Attorney, Agent, or Firm*—Cardinal Law Group

(57) ABSTRACT

A dibit response estimation generator receives a DSS sequence and a DSS readback sequence, which is a function of a channel processing of the DSS sequence by a read channel. The generator generates a cyclic dibit response vector as a function of the DSS sequence and the DSS readback sequence. The generator further generates an error signal as a function of a comparison of the DSS readback sequence and a filtering of the DSS sequence based on the cyclic dibit response vector. An unacceptable error signal indicates a need to adjust the cyclic dibit response vector to yield an acceptable comparison of the DSS readback sequence and the filtering of the DSS sequence based on the cyclic dibit response vector.

34 Claims, 9 Drawing Sheets

US 7,428,116 B2

METHOD FOR A CYCLIC DIBIT RESPONSE ESTIMATION IN A MEDIA SYSTEM USING A DATA SET SEPARATOR SEQUENCE

FIELD OF INVENTION

The present invention generally relates to channel identification in read channels of magnetic tape drive systems. The present invention specifically relates to an implementation of a cyclic dibit response estimation technique in a magnetic recording channel using embedded data set separator sequences.

BACKGROUND OF THE INVENTION

FIG. 1 illustrates a known spectrum of a DSS sequence, which consists in NRZI form of a repeated 24 bipolar-symbol pattern as follows:

$$p_{24} = \{+1+1+1+1+1+1+1+1+1+1+1+1-1-1-1-1-1-1-1-1-1-1-1-1\}.$$

This data set separator sequence can thus be regarded as a periodic square wave s(t) with a period 24T, where T denotes the symbol duration. A Fourier transform of this square wave is given by the following equation (1):

$$S(f) = \sum_{n} S_n \delta\left(f - \frac{n}{24T}\right), \quad (1)$$

with $$S_n \begin{cases} sinc(n/2) & n \text{ odd} \\ 0 & n \text{ even} \end{cases}.$$

Hence, S(f) represents a line spectrum that is nonzero at odd frequencies and decreases in magnitude as 1/f.

The data set separator sequence illustrated in FIG. 1 has been used to identify the cyclic dibit response of the magnetic recording channel. The identified dibit response not only allows one to compute an equalizer (typically a zero-forcing equalizer or a minimum mean-square error equalizer) for the magnetic recording channel, but also enables the use of read channels with noise-predictive maximum likelihood (NPML) detection. NPML detection is needed in high-performance/high-capacity tape systems, where it provides a better match of the target characteristic to the physical channel characteristic as compared with known characteristics such as partial-response class 4 (PR4), extended PR4 (EPR4), etc. The efficient identification of the channel dibit response based on the DSS sequence is addressed here.

SUMMARY OF THE INVENTION

One form of the present invention is signal bearing medium tangibly embodying a program of machine-readable instructions executable by a processor to perform operations for a cyclic dibit response estimation in a read channel of a media system. The operations comprise a reception of an electrical communication of a DSS sequence and a DSS readback sequence, which is a function of a channel processing of the DSS sequence by the read channel. The operations further comprise a generation of a cyclic dibit response vector as a function of the DSS sequence and the DSS readback sequence.

A second form of the present invention is a media system comprising a processor and a memory storing instructions operable with the processor for a cyclic dibit response estimation in a read channel of a media system. The instructions are executed for receiving an electrical communication of a DSS sequence and a DSS readback sequence, which is a function of a channel processing of the DSS sequence by the read channel. The instructions are further executed for generating a cyclic dibit response vector as a function of the DSS sequence and the DSS readback sequence.

A third form of the present invention is method for a cyclic dibit response estimation in a read channel of a media system. The method comprises a reception of an electrical communication of a DSS sequence and a DSS readback sequence, which is a function of a channel processing of the DSS sequence by the read channel. The method further comprises a generation of a cyclic dibit response vector as a function of the DSS sequence and the DSS readback sequence.

A fourth form of the present invention is a media system comprising a read channel and a dibit response estimation generator. The read channel generates a DSS readback sequence as a function of a channel processing of a DSS sequence. The cyclic dibit response estimation generator generates a cyclic dibit response vector as a function of the DSS sequence and the DSS readback sequence.

A fifth form of the present invention is a media system comprising a cyclic dibit response generation unit, and a performance measuring unit. The cyclic dibit response generation unit generates a cyclic dibit response vector as a function of the DSS sequence and the DSS readback sequence, which is a function of a channel processing of the DSS sequence. The performance measurement unit generates an error signal as a function of a comparison of the DSS sequence and a filtering of the DSS readback sequence based on the cyclic dibit response vector.

The forgoing forms and other forms, objects, and aspects as well as features and advantages of the present invention will become further apparent from the following detailed description of the various embodiments of the present invention, read in conjunction with the accompanying drawings. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
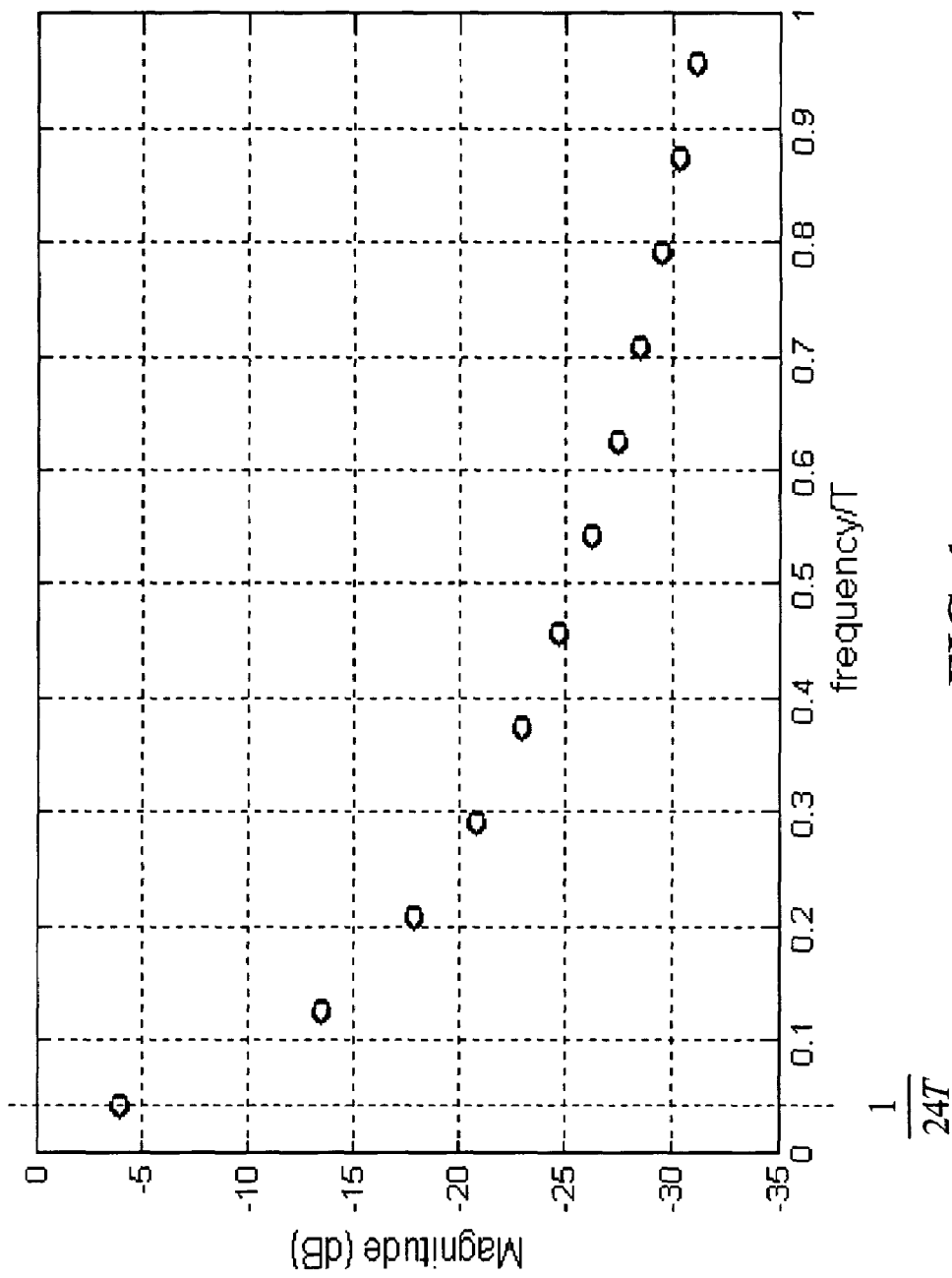
FIG. 1 illustrates a spectrum of a DSS sequence as is known in the art.
Figure 2:
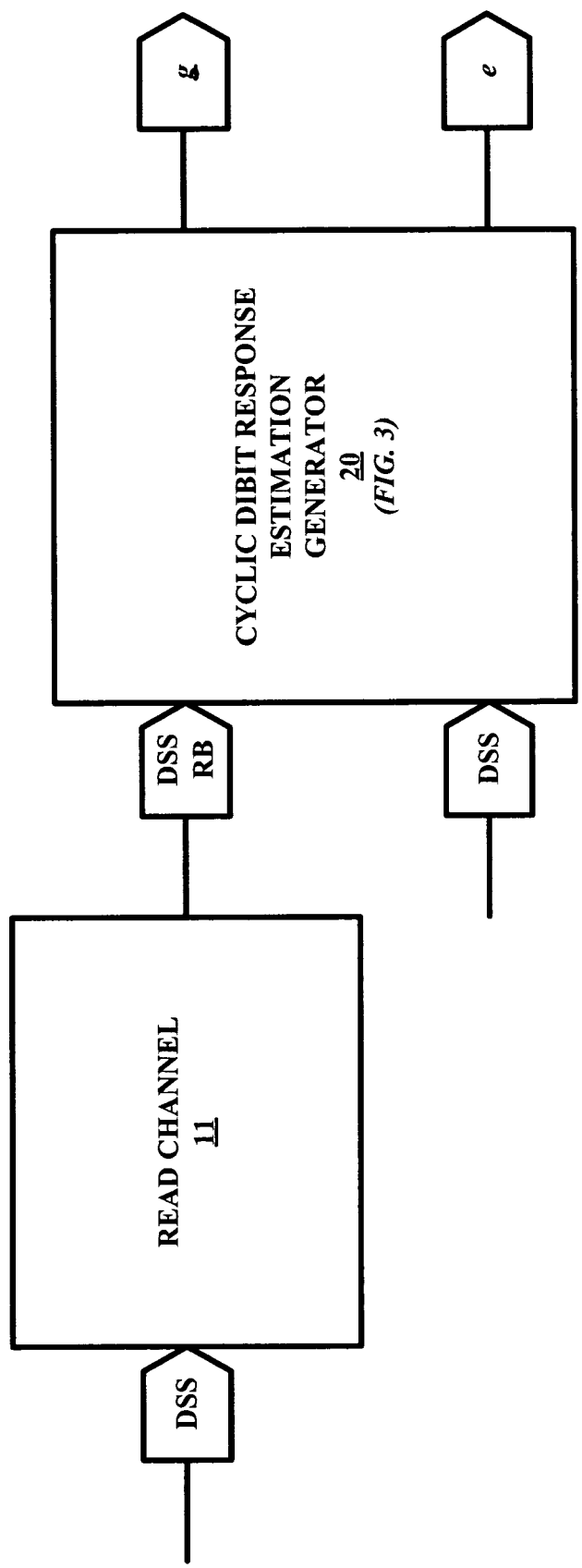
FIG. 2 illustrates a dibit response generator in accordance with the present invention.

FIG. 2 illustrates a cyclic dibit response estimation generator 20 of the present invention. Generator 20 is structurally configured with hardware, software and/or firmware to receive an electrical communication of a DSS sequence ("DSS") and a DSS readback sequence ("DSS RB"), which is generated by a conventional channel processing of the DSS sequence by a read channel 11 (e.g., a magnetic recording channel). Generator 20 is further structurally configured with hardware, software and/or firmware to generate a cyclic dibit response vector g as a function of the DSS sequence and the DSS readback sequence. In one exemplary embodiment, generator 20 executes a N-point sampling of the DSS sequence, executes a N-point sampling of the DSS readback sequence as generated by a conventional channel processing of the DSS sequence by a read channel 11 having an unknown channel response, and executes a computation of N-point samples of cyclic dibit response vector g as a function of the N-point sampling of the DSS sequence and the N-point sampling of the DSS readback sequence.

Generator 20 is also structurally configured with hardware, software and/or firmware to generate an error signal e as a function of a comparison of the DSS readback sequence and a filtering of the DSS reference sequence based on cyclic dibit response vector g. In one exemplary embodiment, generator 20, generates error signal e as a differential between an N-point sampling of the DSS readback sequence and a filtering of an N-point sampling of the DSS sequence based on the N-point samples of cyclic dibit response vector g.

In operation, the unknown channel response of read channel 11 is normally not ideal whereby cyclic dibit response vector g is used to compute an equalizer (not shown) in view of facilitating an acceptable response from read channel 11. Accordingly, generator 20 or an external source (not shown) adjusts the generation of cyclic dibit response vector g by generator 20 as needed to achieve an acceptable differential indication by error signal e for purposes of computing an equalizer with a view of facilitating an acceptable channel response of read channel 11.

In practice, the present invention does not impose any limitations or any restrictions as to the structural configuration of generator 20. Thus, the following description of an exemplary embodiment 21 of generator 20 does not limit the scope of the structural configuration of generator 20.

Figure 3:
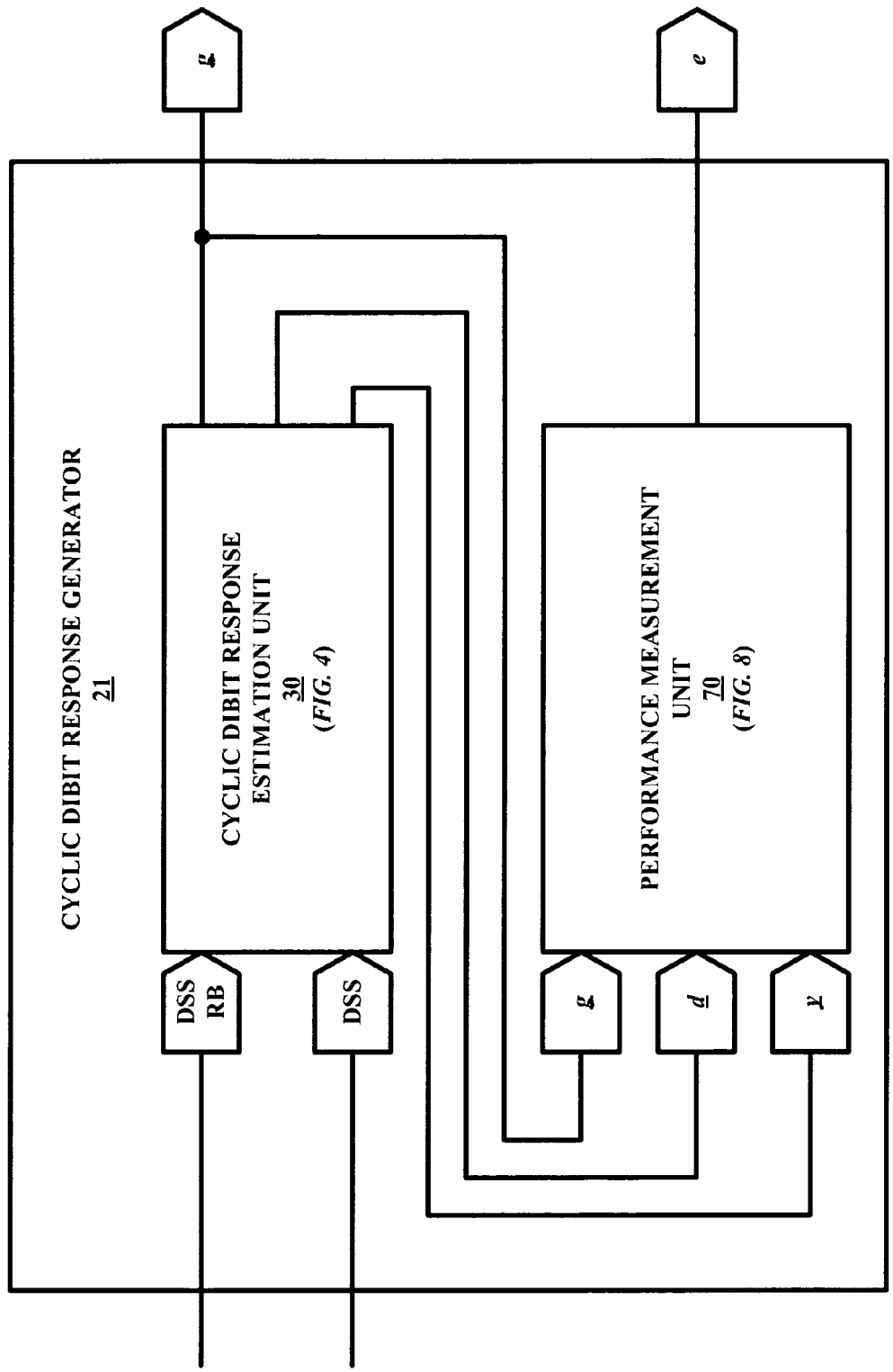
FIG. 3 illustrates one embodiment of the cyclic dibit response generator illustrated in FIG. 2.

FIG. 3 illustrates exemplary embodiment 21 of generator 20 (FIG. 2) employing a cyclic dibit response estimation unit 30 and a performance measurement unit 70. Unit 30 is structurally configured with hardware, software and/or firmware to receive an electrical communication of the DSS sequence and the DSS readback sequence. Unit 30 is further structurally configured with hardware, software and/or firmware to generate a DSS reference vector d as a function of a sampling of the DSS sequence, to generate a DSS readback vector y as a function of a sampling of the DSS readback sequence, and to generate cyclic dibit response vector g as a function of DSS readback vector y and DSS reference vector x.

In one exemplary embodiment, unit 30 generates DSS reference vector d to include N-point samples of the DSS sequence, generates DSS readback vector y to include N-point samples of the DSS readback sequence as generated by a conventional processing of the DSS sequence by read channel 11 (FIG. 2) having an unknown channel response, and generates cyclic dibit response vector g to include N-dibit response samples computed based on DSS readback vector y and DSS reference vector x.

Unit 70 is structurally configured with hardware, software and/or firmware to generate error signal e as a function of a comparison of a filtered DSS reference vector d' and DSS readback vector y. In one exemplary embodiment, unit 70 generates error signal e as a differential between DSS readback vector y including an N-point filtered samples of the DSS readback sequence, and filtered DSS reference vector d' including a filtering of N-point samples of the DSS sequence based on cyclic dibit response vector g including N-dibit response samples.

In practice, the present invention does not impose any limitations or any restrictions as to the structural configuration of units 30 and 70. Thus, the following description of an exemplary embodiments 31 and 71 of respective units 30 and 70 does not limit the scope of the structural configuration of units 30 and 70.

Figure 4:
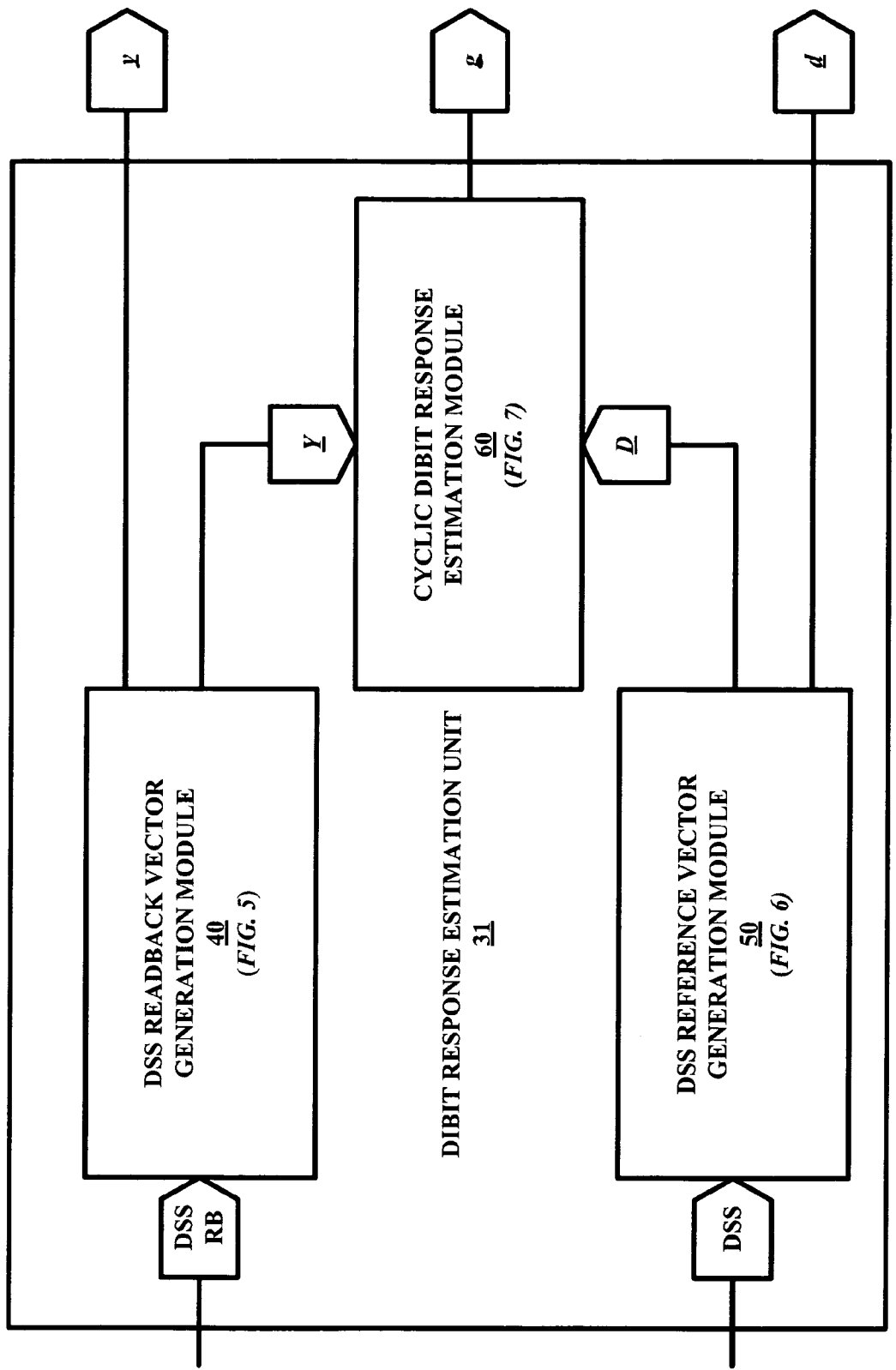
FIG. 4 illustrates one embodiment of a cyclic dibit response generation unit in accordance with the present invention

FIG. 4 illustrates exemplary embodiment 31 of unit 30 (FIG. 3) employing a DSS readback vector generation module 40, a DSS reference vector generation module 50, and a cyclic dibit response estimation module 60.

Module 40 is structurally configured with hardware, software and/or firmware to receive an electrical communication of the DSS readback sequence and to generate DSS readback vector y and a DSS readback complex vector Y as a function of a sampling of the DSS readback sequence. In one exemplary embodiment, module 40 generates DSS readback vector y to include an averaged N-point samples of the DSS readback sequence, and generates DSS readback complex vector Y to include a discrete Fourier transformation of DSS readback vector y.

Module 50 is structurally configured with hardware, software and/or firmware to receive an electrical communication of the DSS sequence, and to generate a DSS reference vector d and a DSS reference complex vector D as a function of a sampling of the DSS sequence. In one exemplary embodiment, module 50 generates DSS reference vector d to include N-point samples of the DSS sequence, and generates DSS reference complex vector D to include a discrete Fourier transformation of DSS reference vector d.

Module 60 is structurally configured with hardware, software and/or firmware to receive an electrical communication of DSS readback complex vector Y and DSS reference complex vector D, and to generate cyclic dibit response vector g as a function of DSS readback complex vector Y and DSS reference complex vector D. In one exemplary embodiment, module 60 generates odd indices of a cyclic dibit response complex vector G as a function of a diagonal matrix based on DSS reference complex vector D and DSS readback complex vector Y, generates even indices of a cyclic dibit response complex vector G as a function of an interpolation of the odd indices of cyclic dibit response complex vector G and generates cyclic dibit response vector g as a function of an inverse Fourier transformation of the computed odd indices and interpolated even indices of cyclic dibit response complex vector G.

In operation, N-dibit response samples of cyclic dibit response vector g are cyclically rotated for a best alignment (e.g., bringing the positive peak and the negative peak of the cyclic dibit response to the center) before being used to perform an equalizer computation by any well-known method (e.g., a zero-forcing equalization or a minimum mean square error equalization). Alternatively or concurrently, based on the N-dibit response samples of cyclic dibit response vector g, it is also possible to determine the jointly optimum target and equalizer characteristics to be used in an NPML design. In applications requiring less than N-dibit response coefficients, the obtained dibit response can be truncated or approximated as would be appreciated by those having ordinary skill in the art.

In practice, the present invention does not impose any limitations or any restrictions as to the structural configurations of modules 40, 50 and 60. Thus, the following description of exemplary embodiments 41, 51 and 61 of modules 40, 50 and 60 as illustrated respectively in FIGS. 5-7 does not limit the scope of the structural configurations of modules 40, 50 and 60.

Figure 5:
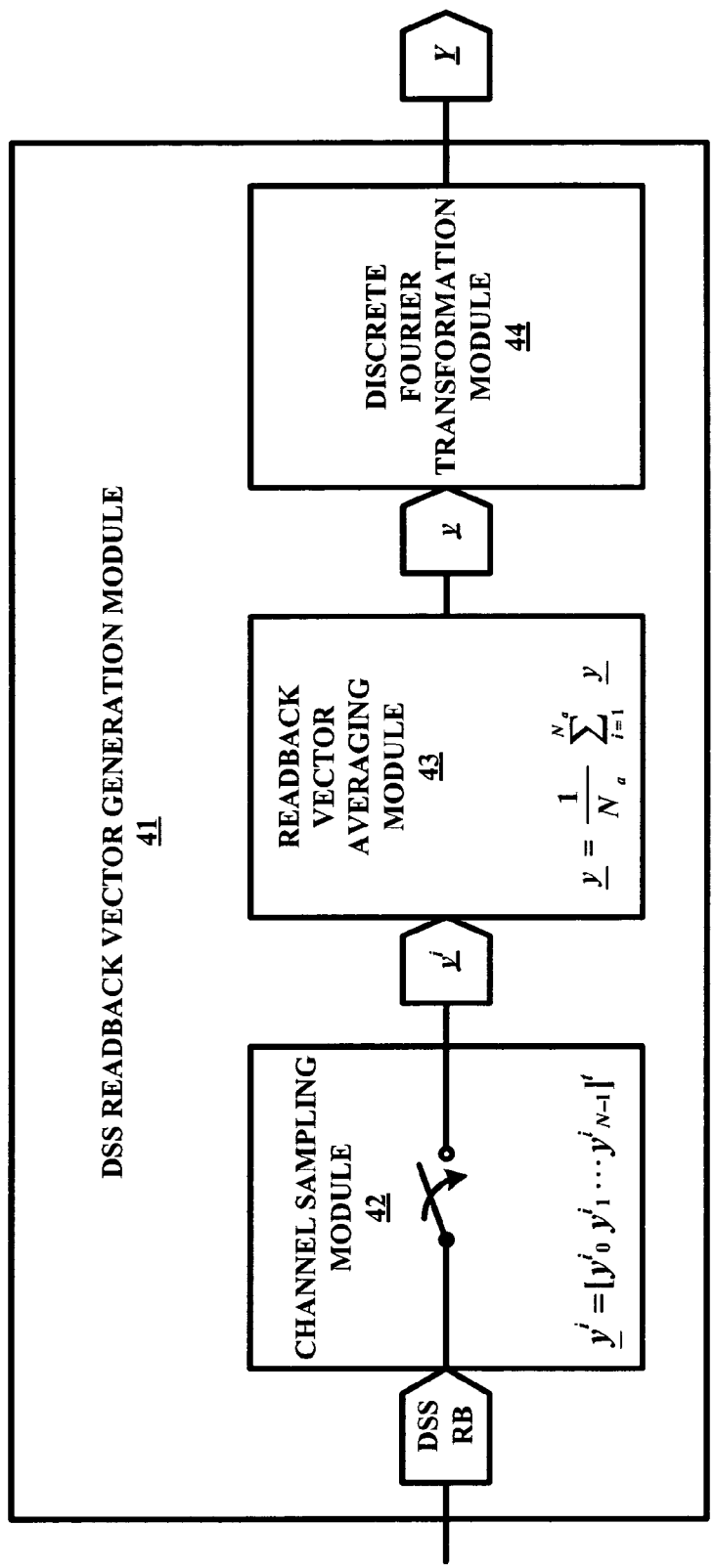
FIG. 5 illustrates one embodiment of a DSS readback vector generation module in accordance with the present invention.

FIG. 5 illustrates an embodiment 41 of module 40 (FIG. 3) employing a channel sampling module 42, a readback vector averaging module 43, and a discrete Fourier transformation module 44.

Module 42 is structurally configured with hardware, software and/or firmware to execute a N-point sampling of the DSS readback sequence at a sample rate of $1/T_S=5/(4T)$ to yield a channel sampled readback vector $y^i=[y^i_0 y^i_1 \ldots y^i_{N-1}]^t$ of N consecutive $T_S=(4/5)T$ spaced samples of an actual readback DSS waveform. In general, the number of samples N is equal to the number of coefficients in the cyclic dibit response and $N T_S$ is equal to one period of the DSS sequence, that is, $N T_S=24 T$.

Module 43 is structurally configured with hardware, software and/or firmware to average DSS readback vector y over a set of readback vectors $y^i, i=1, 2, \ldots N_{av}$, in accordance with $$\underline{y} = \frac{1}{N_a} \sum_{i=1}^{N_a} \underline{y}^i.$$

Module 44 is structurally configured with hardware, software and/or firmware to perform a discrete Fourier transformation of DSS readback vector y to yield readback complex vector Y.

Figure 6:
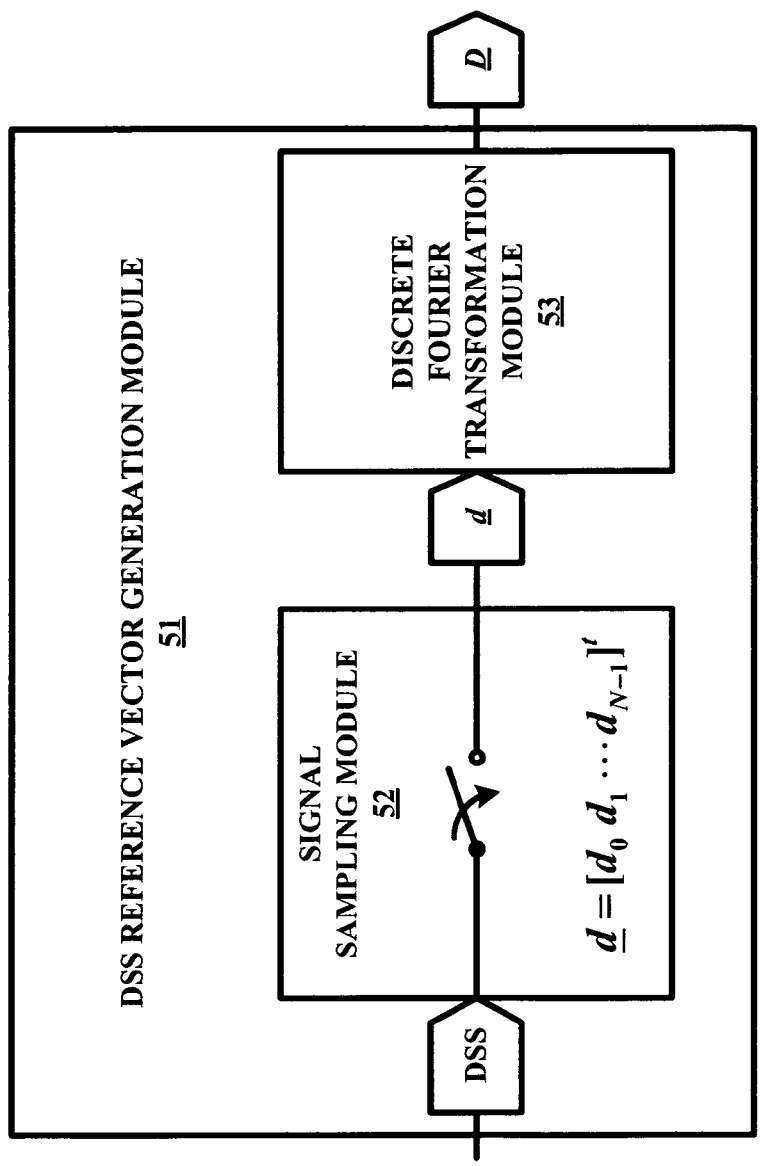
FIG. 6 illustrates one embodiment of a DSS reference vector generation module in accordance with the present invention.

FIG. 6 illustrates exemplary embodiment 51 of module 50 (FIG. 3) employing a signal sampling module 52, and a discrete Fourier transformation module 53.

Module 52 is structurally configured with hardware, software and/or firmware to perform a N-point sampling of the DSS sequence at a sample rate of $5/(4T)$ to yield DSS reference vector $d=[d_0 d_1 \ldots d_{N-1}]^t$ including N consecutive $(4/5)T$ spaced samples of the DSS sequence. Again, in general, the number of samples N is equal to the number of coefficients of the cyclic dibit response and $N T_S$ is equal to one period of the DSS sequence, that is, $N T_S=24 T$.

Module 53 is structurally configured with hardware, software and/or firmware to perform a discrete Fourier transformation of the DSS reference vector d to yield DSS reference complex vector D.

Figure 7:
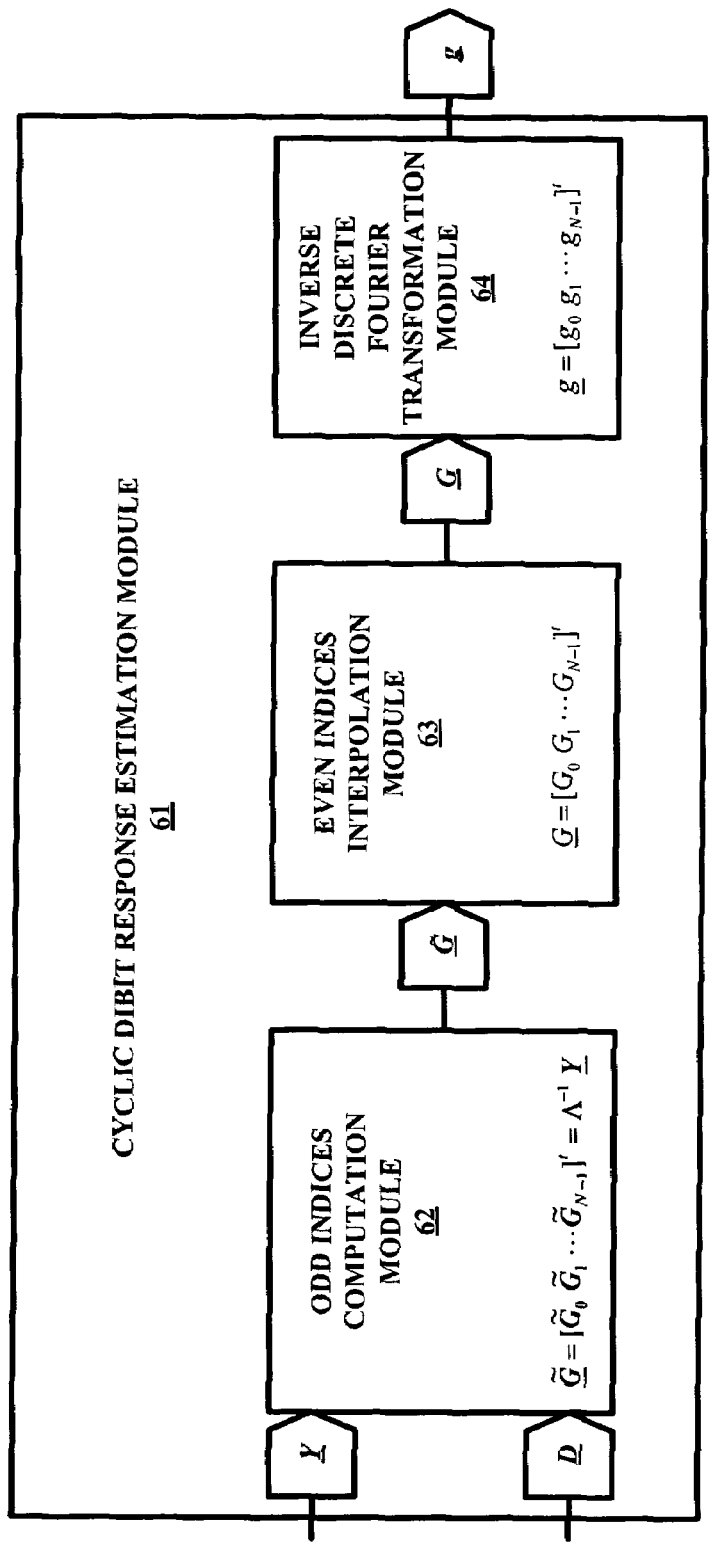
FIG. 7 illustrates one embodiment of a cyclic dibit response generation module in accordance with the present invention.

FIG. 7 illustrates exemplary embodiment 61 of module 60 (FIG. 2) employing an odd indices computation module 62, an even indices interpolator module 63 and an inverse discrete Fourier transformation module 64.

Module 62 is structurally configured with hardware, software and/or firmware to generate a N-point cyclic dibit response complex vector G as a function of a N×N diagonal matrix based on DSS reference complex vector D and DSS readback complex vector Y in accordance with $\tilde{G}=[\tilde{G}_0 \tilde{G}_1 \ldots \tilde{G}_{N-1}]^t=\Lambda^{-1}D$, where $\Lambda=\text{diag}(D)$.

Module 63 is structurally configured with hardware, software and/or firmware to linearly interpolate, in magnitude and phase, odd indices of cyclic dibit response complex vector G to obtain the spectral values $G=[G_0 G_1 \ldots G_{N-1}]^t$, with $$|G_i| = \frac{|\tilde{G}_{i-1}| + |\tilde{G}_{i+1}|}{2}$$

and $$\phi(G_i) = \frac{\phi(\tilde{G}_{i-1}) + \phi(\tilde{G}_{i+1})}{2},$$

where $\phi(A)$ denotes the phase of the complex number A, and $i=2, 4, \ldots, N/2$ for N even, and $i=2, 4, \ldots, (N-3)/2$ for N odd and $G_i=\tilde{G}_i$ for i odd. In this embodiment, the spectral component with index $i=0$ is undetermined. Accordingly, this component is set to a small value without affecting the solution, because the magnetic recording channel does not transmit dc.

Module 64 is structurally configured with hardware, software and/or firmware to perform an inverse discrete Fourier transformation of the spectral values of the N-point cyclic dibit response complex vector G to yield cyclic dibit response vector g including N-dibit response samples in accordance with $g=[g_0 g_1 \ldots g_{N-1}]^t$.

Figure 8:
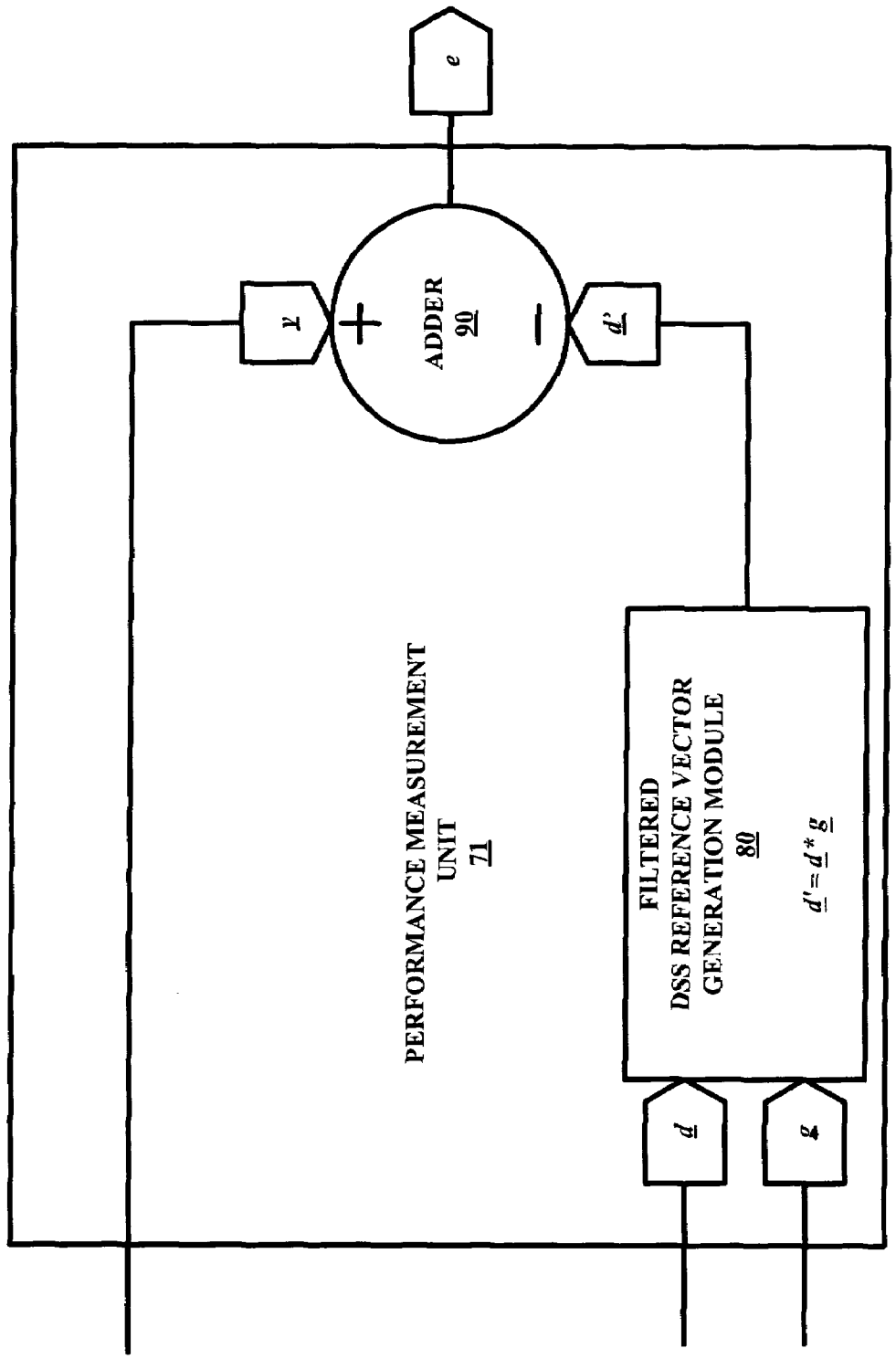
FIG. 8 illustrates one embodiment of a performance measurement unit in accordance with the present invention.

FIG. 8 illustrates an exemplary embodiment 71 of performance measurement unit 70 (FIG. 2) of the present invention employing a filtered DSS reference vector generation module 80 and an adder 90.

Module 80 is structurally configured with hardware, software and/or firmware to receive an electrical communication of DSS reference vector d and the cyclic dibit response vector g, and to generate a filtered DSS reference vector d' as a function of a filtering of DSS reference vector d based on cyclic dibit response g. In one exemplary embodiment, module 80 generates N-point samples of filtered DSS reference vector d' in accordance with d'=d*g, where * denotes convolution.

Adder 90 is structurally configured with hardware, software and/or firmware to receive an electrical communication of DSS readback vector y and filtered DSS reference vector d', and to generate an error signal e as a differential between DSS readback vector y and filtered DSS reference vector d'. Those having ordinary skill in the art will appreciate a representation by error signal e of zero (0) difference between DSS readback vector y and filtered DSS reference vector d' indicates an accurate computation of the N-point cyclic dibit response vector g. Conversely, those having ordinary skill in the art will appreciate a representation by error signal e of a non-zero difference between DSS readback vector y and filtered DSS reference vector d' indicates an inaccurate computation of N-point cyclic dibit response vector g. In this case, various parameters of equalizer 12 (FIG. 2) and/or generator 20 (FIG. 2) can be reconfigured until such time error signal e represents an acceptably small difference between DSS readback vector y and filtered DSS reference vector d'. In operation, the DSS readback sequences, the number $N_\alpha$ of such sequences, the relative time alignments of signals y and d, the cyclic recentering of the cyclic dibit response coefficients are among the parameters that are adjusted for reducing the error signal e to an acceptably small value.

In practice, the present invention does not impose any limitations or any restrictions as to the structural configurations of adder 90. Thus, the preceding description of exemplary embodiment of adder 90 does not limit the scope of the structural configurations of module 90.

Referring to FIG. 8, an alternative embodiment of unit 71 can employ versions of modules 42 and 43 as previously described herein in connection with FIG. 5 to generate and provide DSS readback vector y to adder 90. Alternatively or concurrently, unit 71 can also employ a version of module 52 as previously described herein in connection with FIG. 7 to generate and provide DSS reference vector d to module 80.

Figure 9:
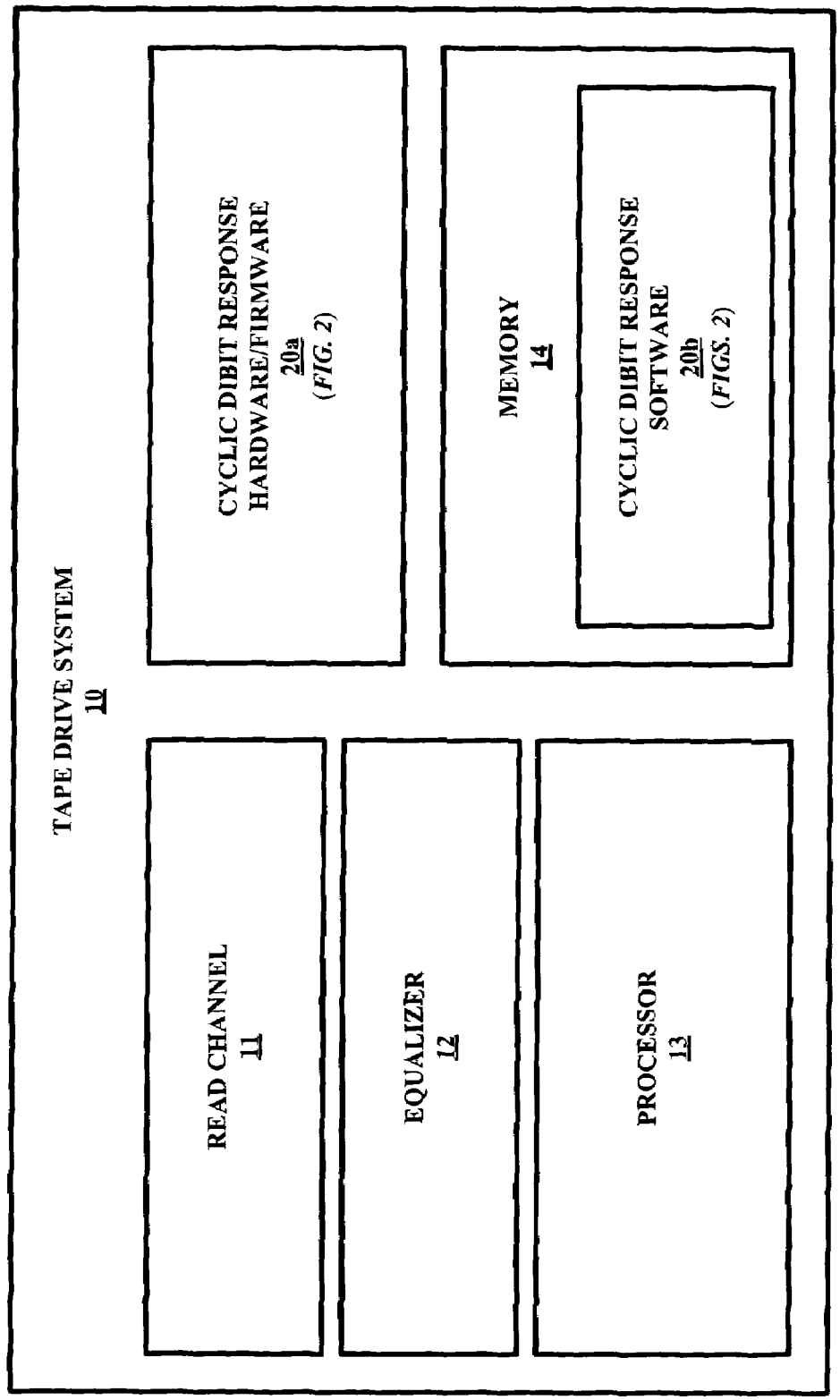
FIG. 9 illustrates one embodiment of a tape drive system in accordance with the present invention.

FIG. 9 illustrates a tape drive system 10 employing read channel 11, an equalizer 12, a processor 13 and a memory 14. FIG. 9 does not illustrate any particular interface architecture of channel 11, equalizer 12, processor 13 and memory 14, because in practice, the present invention does not impose any limitations or any restrictions as to the interfacing of components 11-14 and any other components of system 10 as would occur to those having ordinary skill in the art. In practice, as would be appreciated by those having ordinary skill in the art, each component of generator 20 (FIG. 2) can be incorporated in the interface architecture as hardware/firmware 20a, or as software 20b written in any conventional language and installed within a memory 14 whereby processor 13 can execute software 20b.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A computer usable medium including computer readable code for performing operations for a cyclic dibit response estimation in a read channel of a media system, the operations comprising: receiving an electrical communication of a data set separator sequence and a data set separator readback sequence, wherein the data set separator readback sequence is a function of a channel processing of the data set separator sequence by the read channel; and generating a cyclic dibit response vector as a function of the data set separator sequence and the data set separator readback sequence.

2. The medium of claim 1, wherein the operations further comprise: generating an error signal as a function of a comparison of an averaged sampling of the data set separator readback sequence and a sampling of a filtering of the data set separator sequence based on the cyclic dibit response vector.

3. The medium of claim 1, wherein the generating of the cyclic dibit response vector as a function of the data set separator sequence and the data set separator readback sequence includes: generating a data set separator readback vector as a function of a sampling of the data set separator readback sequence; generating a data set separator reference vector as a function of a sampling of the data set separator sequence; and generating the cyclic dibit response vector as a function of the data set separator readback vector and the data set separator reference vector.

4. The medium of claim 3, wherein the operations further comprise: generating an error signal as a function of a comparison of the data set separator readback vector and a sampling of a filtering of the data set separator sequence based on the cyclic dibit response vector.

5. The medium of claim 3, wherein the generating of the cyclic dibit response vector as a function of the data set separator readback vector and the data set separator reference vector further includes: generating odd indices of the cyclic dibit response vector as a function of a diagonal matrix based on the data set separator readback vector and the data set separator reference vector; and generating even indices of the cyclic dibit response complex vector as a function of an interpolation of the odd indices of the cyclic dibit response complex vector.

6. The medium of claim 1, wherein the generating of the cyclic dibit response vector as a function of the data set separator sequence and the data set separator readback sequence includes: generating a data set separator readback complex vector as a function of a discrete Fourier transformation of an averaged sampling of the data set separator readback sequence; generating a data set separator reference complex vector as a function of a discrete Fourier transformation of a sampling of the data set separator sequence; and generating a cyclic dibit response complex vector as a function of the data set separator readback complex vector and the data set separator reference complex vector.

7. The medium of claim 6, wherein the generating of the cyclic dibit response vector as a function of the data set separator sequence and the data set separator readback sequence further includes: generating odd indices of the cyclic dibit response complex vector as a function of a diagonal matrix based on the data set separator reference complex vector and the data set separator readback complex vector; generating even indices of the cyclic dibit response complex vector as a function of an interpolation of the odd indices of the cyclic dibit response complex vector; and generating the cyclic dibit response vector as a function of an inverse discrete Fourier transformation of the cyclic dibit response complex vector.

8. A system, comprising: a processor; and a memory storing instructions operable with the processor for a cyclic dibit response estimation in a read channel, the instructions being executed for: receiving an electrical communication of a data set separator sequence and a data set separator readback sequence, wherein the data set separator readback sequence is a function of a channel processing of the data set separator sequence by the read channel; and generating a cyclic dibit response vector as a function of the data set separator sequence and the data set separator readback sequence.

9. The system of claim 8, wherein the instructions are further executed for: generating an error signal as a function of a comparison of an averaged sampling of the data set separator readback sequence and a sampling of a filtering of the data set separator sequence based on the cyclic dibit response vector.

10. The system of claim 8, wherein the generating of the cyclic dibit response vector as a function of the data set separator sequence and the data set separator readback sequence includes: generating a data set separator readback vector as a function of a sampling of the data set separator readback sequence; generating a data set separator reference vector as a function of a sampling of the data set separator sequence; and generating the cyclic dibit response vector as a function of the data set separator readback vector and the data set separator reference vector.

11. The system of claim 10, wherein the instructions are further executed for generating an error signal as a function of a comparison of the data set separator readback vector and a sampling of a filtering of the data set separator sequence based on the cyclic dibit response vector.

12. The system of claim 10, wherein the generating of the cyclic dibit response vector as a function of the data set separator readback vector and the data set separator reference vector further includes: generating odd indices of the cyclic dibit response complex vector as a function of a diagonal matrix based on the data set separator reference vector and the data set separator readback vector; and generating even indices of the cyclic dibit response complex vector as a function of an interpolation of the odd indices of the cyclic dibit response complex vector.

13. The system of claim 8, wherein the generating of the cyclic dibit response vector as a function of the data set separator sequence and the data set separator readback sequence includes: generating a data set separator readback complex vector as a function of a discrete Fourier transformation of an averaged sampling of the data set separator readback sequence; generating a data set separator reference complex vector as a function of a discrete Fourier transformation of a sampling of the data set separator sequence; and generating a cyclic dibit response complex vector as a function of the data set separator readback complex vector and the data set separator reference complex vector.

14. The system of claim 13, wherein the generating of the cyclic dibit response vector as a function of the data set separator sequence and the data set separator readback sequence further includes: generating odd indices of the cyclic dibit response complex vector as a function of a diagonal matrix based on the data set separator reference complex vector and the data set separator readback complex vector; generating even indices of the cyclic dibit response complex vector as a function of an interpolation of the odd indices of the cyclic dibit response complex vector; and generating the cyclic dibit response vector as a function of an inverse discrete Fourier transformation of the cyclic dibit response complex vector.

15. A method for dibit response estimation in a read channel of a media system, the method comprising: receiving an electrical communication of a data set separator sequence and a data set separator readback sequence, wherein the data set separator readback sequence is a function of a channel processing of the data set separator sequence by the read channel; and generating a cyclic dibit response vector as a function of the data set separator sequence and the data set separator readback sequence.

16. The method of claim 15, for comprising: generating an error signal as a function of a comparison of an averaged sampling of the data set separator readback sequence and a sampling of a filtering of the data set separator sequence based on the cyclic dibit response vector.

17. The method of claim 15, wherein the generating of the cyclic dibit response vector as a function of the data set separator sequence and the data set separator readback sequence includes: generating a data set separator readback vector as a function of a sampling of the data set separator readback sequence; generating a data set separator reference vector as a function of a sampling of the data set separator sequence; and generating the cyclic dibit response vector as a function of the data set separator readback vector and the data set separator reference vector.

18. The method of claim 17, further comprising: generating an error signal as a function of a comparison of the data set separator readback vector and a sampling of a filtering of the data set separator sequence based on the cyclic dibit response vector.

19. The method of claim 17, wherein the generating of the cyclic dibit response vector as a function of the data set separator readback vector and the data set separator reference vector further includes: generating odd indices of the cyclic dibit response complex vector as a function of a diagonal matrix based on the data set separator reference vector and the data set separator readback vector; and generating even indices of the cyclic dibit response complex vector as a function of an interpolation of the odd indices of the cyclic dibit response complex vector.

20. The method of claim 15, wherein the generating of the cyclic dibit response vector as a function of the data set separator sequence and the data set separator readback sequence includes: generating a data set separator readback complex vector as a function of a discrete Fourier transformation of an averaged sampling of the data set separator readback sequence; generating a data set separator reference complex vector as a function of a discrete Fourier transformation of sampling of the data set separator sequence; and generating a cyclic dibit response complex vector as a function of the data set separator readback complex vector and the data set separator reference complex vector.

21. The method of claim 20, wherein the generating of the cyclic dibit response vector as a function of the data set separator sequence and the data set separator readback sequence further includes: generating odd indices of the cyclic dibit response complex vector as a function of a diagonal matrix based on the data set separator reference complex vector and the data set separator readback complex vector; generating even indices of the cyclic dibit response complex vector as a function of an interpolation of the odd indices of the cyclic dibit response complex vector; and generating the cyclic dibit response vector as a function of an inverse discrete Fourier transformation of the cyclic dibit response complex vector.

22. A media system, comprising: a read channel operable to receive an electrical communication of a data set separator sequence, wherein the read channel is further operable to generate a data set separator readback sequence as a function of a channel processing of a data set separator sequence; and a cyclic dibit response estimation generator operable to receive an electrical communication of the data set separator sequence and the data set separator readback sequence, wherein the cyclic dibit response generator is further operable to generate a cyclic dibit response vector as a function of the data set separator sequence and the data set separator readback sequence.

23. The media system of claim 22, wherein the cyclic dibit response estimation generator is further operable to generate an error signal as a function of a comparison of an averaged sampling of the data set separator readback sequence and a sampling of a filtering of the data set separator sequence based on the cyclic dibit response vector.

24. The media system of claim 22, wherein the generating by the cyclic dibit response estimation generator of the cyclic dibit response vector as a function of the data set separator sequence and the data set separator readback sequence includes: generating a data set separator readback vector as a function of an averaged sampling of the data set separator readback sequence; generating a data set separator reference vector as a function of a sampling of the data set separator sequence; and generating the cyclic dibit response vector as a function of the data set separator readback vector and the data set separator reference vector.

25. The media system of claim 24, wherein the cyclic dibit response estimation generator is further operable to generate an error signal as a function of a comparison of the data set separator readback vector and a sampling of a filtering of the data set separator sequence based on the cyclic dibit response vector.

26. The media system of claim 24, wherein the generating by the cyclic dibit response estimation generator of the cyclic dibit response vector as a function of the data set separator readback vector and the data set separator reference vector further includes: generating odd indices of the cyclic dibit response complex vector as a function of a diagonal matrix based on the data set separator reference vector and the data set separator readback vector; and generating even indices of the cyclic dibit response complex vector as a function of an interpolation of the odd indices of the cyclic dibit response complex vector.

27. The media system of claim 22, wherein the generating by the cyclic dibit response estimation generator of the cyclic dibit response vector as a function of the data set separator sequence and the data set separator readback sequence includes: generating a data set separator readback complex vector as a function of a discrete Fourier transformation of an averaged sampling of the data set separator readback sequence; generating a data set separator reference complex vector as a function of a discrete Fourier transformation of a sampling of the data set separator sequence; and generating a cyclic dibit response complex vector as a function of the data set separator readback complex vector and the data set separator reference complex vector.

28. The media system of claim 27, wherein the generating by the cyclic dibit response estimation generator of the cyclic dibit response vector as a function of the data set separator sequence and the data set separator readback sequence further includes: generating odd indices of the cyclic dibit response complex vector as a function of a diagonal matrix based on the data set separator reference complex vector and the data set separator readback complex vector; generating even indices of the cyclic dibit response complex vector as a function of an interpolation of the odd indices of the cyclic dibit response complex vector; and generating the cyclic dibit response vector as a function of an inverse discrete Fourier transformation of the cyclic dibit response complex vector.

29. A system, comprising: a cyclic dibit response estimation unit operable to receive an electrical communication of a data set separator sequence and a data set separator readback sequence, wherein the data set separator readback sequence is a function of a channel processing of the data set separator sequence by a read channel, and wherein the cyclic dibit response estimation unit is further operable to generate a cyclic dibit response vector as a function of the data set separator sequence and the data set separator readback sequence; and a performance measurement unit operable to receive an electrical communication of the data set separator sequence, the data set separator readback sequence, and the cyclic dibit response vector, wherein the performance management unit is operable to generate an error signal as a function of a comparison of a sampling of the data set readback separator sequence and a sampling of a filtering of the data set separator sequence based on the cyclic dibit response vector.

30. The system of claim 29, wherein the generating by the cyclic dibit response estimation unit of the cyclic dibit response vector as a function of the data set separator sequence and the data set separator readback sequence includes: generating a data set separator readback vector as a function of an averaged sampling of the data set separator readback sequence; generating a data set separator reference vector as a function of a sampling of the data set separator sequence; and generating the cyclic dibit response vector as a function of the data set separator readback vector and the data set separator reference vector.

31. The system of claim 30, wherein the receiving by the performance measurement unit of the electrical communication of the data set separator readback sequence includes receiving an electrical communication of the data set separator readback vector; and wherein the generating by the performance measurement unit of the error signal as a function of a comparison of averaged sampling of the data set separator sequence and the sampling of the filtering of the data set separator sequence based on the cyclic dibit response vector includes generating the error signal as a function of a comparison of the data set separator readback vector and the sampling of the filtering of the data set separator sequence based on the cyclic dibit response vector.

32. The system of claim 30, wherein the generating by the cyclic dibit response estimation unit of the cyclic dibit response vector as a function of the data set separator readback vector and the data set separator reference vector by the cyclic dibit response generator further includes: generating odd indices of the cyclic dibit response vector as a function of a diagonal matrix based on the data set separator reference vector and the data set separator readback vector; and generating even indices of the cyclic dibit response complex vector as a function of an interpolation of the odd indices of the cyclic dibit response complex vector.

33. The system of claim 29, wherein the generating by the cyclic dibit response estimation unit of the cyclic dibit response vector as a function of the data set separator sequence and the data set separator readback sequence includes: generating a data set separator readback complex vector as a function of a discrete Fourier transformation of an averaged sampling of the data set separator readback sequence; generating a data set separator reference complex vector as a function of a discrete Fourier transformation of a sampling of the data set separator sequence; and generating a cyclic dibit response complex vector as a function of the data set separator readback complex vector and the data set separator reference complex vector.

34. The system of claim 33, wherein the generating by the cyclic dibit response estimation unit of the cyclic dibit response vector as a function of the data set separator sequence and the data set separator readback sequence by the cyclic dibit response generator further includes: generating odd indices of the cyclic dibit response complex vector as a function of a diagonal matrix based on the data set separator reference complex vector and the data set separator readback complex vector; generating even indices of the cyclic dibit response complex vector as a function of an interpolation of the odd indices of the cyclic dibit response complex vector; and generating the cyclic dibit response vector as a function of an inverse discrete Fourier transformation of the cyclic dibit response complex vector.

* * * * *